United States Patent [19]

Erwin

[11] Patent Number: 4,461,113
[45] Date of Patent: Jul. 24, 1984

[54] AUTOMATIC FISHHOOK SETTING APPARATUS

[75] Inventor: Charles W. Erwin, Omaha, Nebr.

[73] Assignee: G. Gene Henthorn, Omaha, Nebr. ; a part interest

[21] Appl. No.: 403,711

[22] Filed: Jul. 30, 1982

[51] Int. Cl.³ ............................................. A01K 97/12
[52] U.S. Cl. ......................................................... 43/15
[58] Field of Search ..................................... 43/15, 16

[56] References Cited

U.S. PATENT DOCUMENTS

| | | | |
|---|---|---|---|
| 2,804,277 | 8/1957 | Kinder | 43/15 |
| 3,170,262 | 2/1965 | Hall | 43/15 |
| 3,973,346 | 8/1976 | Mason | 43/15 |
| 4,142,315 | 3/1979 | Hoffman | 43/15 |
| 4,159,589 | 7/1979 | Pendegraft | 43/15 |
| 4,235,035 | 11/1980 | Guthrie | 43/15 |
| 4,391,059 | 7/1983 | Cordova | 43/15 |

Primary Examiner—Gene P. Crosby

Attorney, Agent, or Firm—Zarley, McKee, Thomte, Voorhees & Sease

[57] ABSTRACT

An automatic fishhook setting apparatus includes a base which is detachably mounted on an anchor post with freedom of side-to-side pivotal movement. A fishing rod support member is hingedly connected to the base for pivotal movement between a set position wherein a fishing rod is supported in forwardly extended relation and a release position wherein the rod is moved to an upright position. The rod support member is biased toward its release position but may be releasably latched in the set position by an elongated upright trigger pivotally connected to the base and having a latching surface engageable with the rod support member. A portion of the fishing line adjacent the reel is trained rearwardly around the upper end of the trigger so that strikes on the line by a fish pivot the trigger forwardly causing the fishing rod and rod support member to be pivoted upwardly to securely set the hook in a fish's mouth.

6 Claims, 6 Drawing Figures

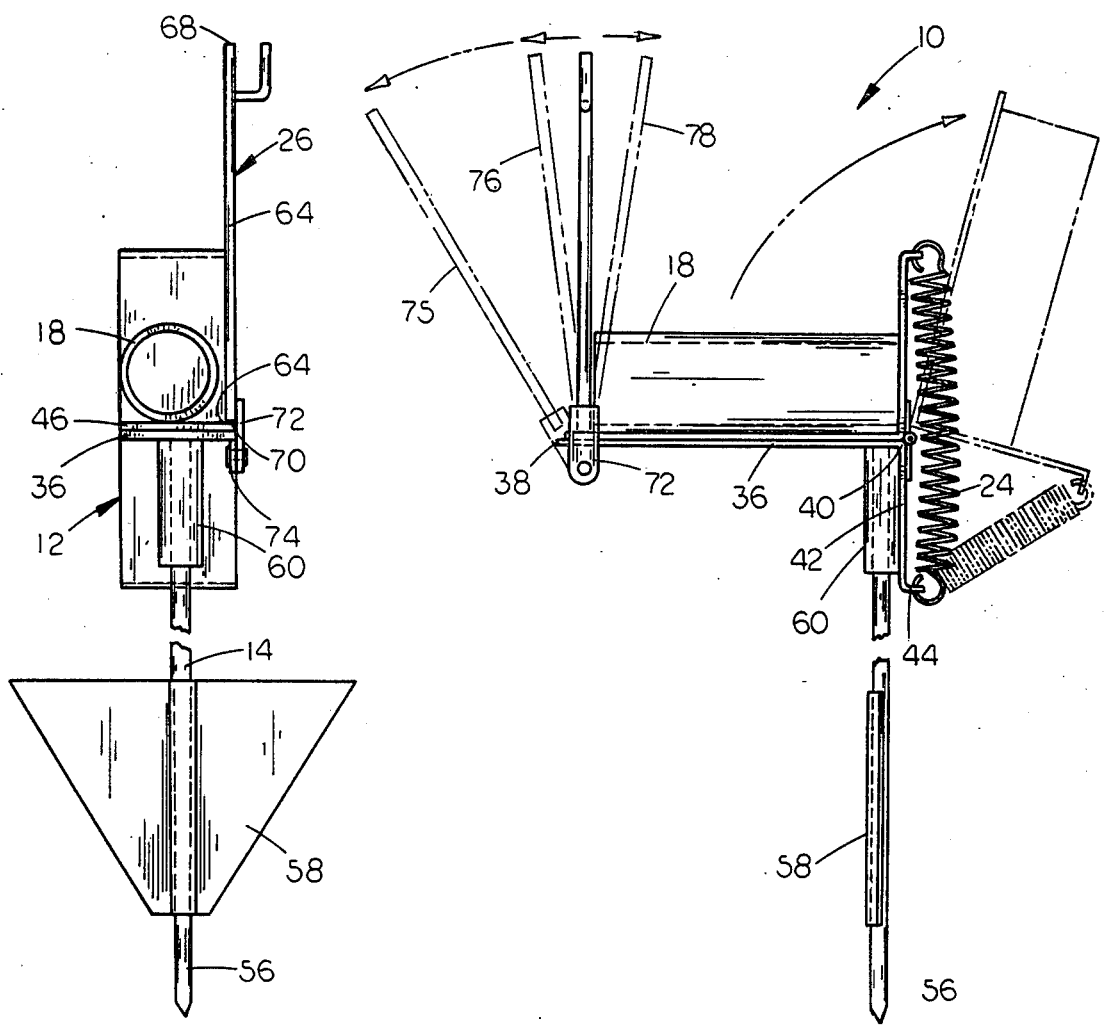
FIG. 4
FIG. 2
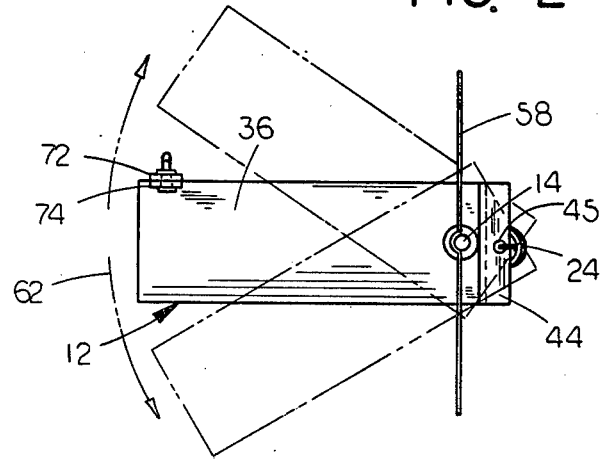
FIG. 3

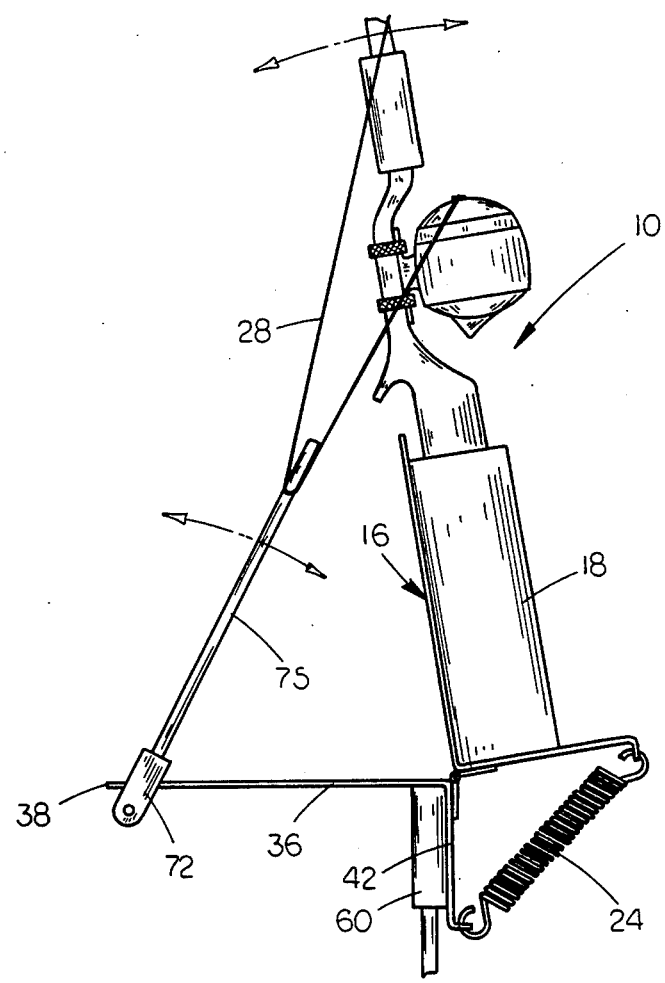
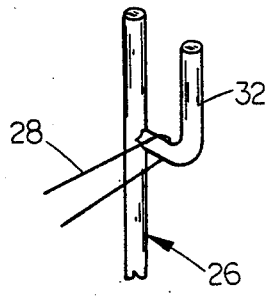
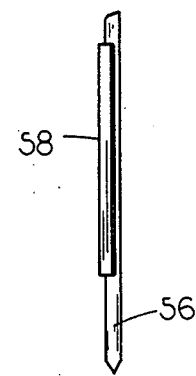
FIG. 6  FIG. 5

AUTOMATIC FISHHOOK SETTING APPARATUS

BACKGROUND OF THE INVENTION

The present invention is directed generally to an apparatus for independently supporting a fishing rod without operator assistance and more particularly to such a device which is automatically capable of setting a hook in a fish's mouth in response to a bite on the line of a fishing rod supported in the apparatus.

Other devices have previously been proposed for supporting a fishing rod and setting the hook but these known devices have certain shortcomings. The device of U.S. Pat. No. 4,235,035, for example, is a relatively large structure which does not lend itself to ready disassembly without tools for shipping and storage. Separate fasteners are required for connection to the opposite ends of the actuating spring. Furthermore, the rod supporting portion of the device is constrained against side-by-side pivotal movement relative to the fixed anchor post. Finally, the actuating trigger for such a device is offset below the rod at a position where the force for actuating the device to set a hook is directed perpendicular to the axis of the fishing rod. These and other problems are believed to be resolved by the apparatus of the present invention.

Accordingly, a primary object of the invention is to provide an improved automatic fishhook setting apparatus.

Another object is to provide such an apparatus with the rod supporting portion thereof free to pivot from side to side in response to swimming movements of a fish on the line.

Another object is to provide such an apparatus designed to eliminate the need for separate fasteners for the actuating spring.

Another object is to provide such an apparatus with a trigger which may be set at various positions to vary the degree of pull required to trip the device.

Another object is to provide such an apparatus wherein the line of force required for tripping the trigger is generally parallel to the axis of the fishing rod.

Another object is to provide such an apparatus which may be readily disassembled and compactly packaged for shipping and storage.

Finally, another object is to provide such an apparatus which is economical to manufacture, durable in construction and efficient in operation.

SUMMARY OF THE INVENTION

The automatic fishhook setting apparatus of the present invention includes a base detachably connected to an anchor post which is adapted for insertion into the ground. A fishing rod support member is connected to the base for pivotal movement between set and release positions and a spring urges the rod support member to its release position. The rod support member may be pivotally moved against the urging of the spring to the set position where it is releasably held by a coacting latch means on the base and rod support member. The latch includes an elongated upstanding trigger pivotally connected to the base and engageable with an upwardly facing latching surface on the rod support member. The fish line from the reel is trained rearwardly through a fish line retaining means on the trigger and then forwardly through the eyes of the fishing rod. Accordingly, when a fish bites at the bait, the line is pulled, tripping the trigger, whereupon the spring raises the fishing rod support member to securely set the hook in the fish's mouth.

Integral flanges on the base and fishing rod support member eliminate any need for separate fasteners for the actuating spring. The base is pivotally and detachably mounted on the anchor post so that longer or shorter anchor posts may be substituted as desired. The slip fit connection between the base and anchor post also facilitates disassembly for packaging of the device in smaller more efficient containers. By wrapping the line around the retainer at the top of the trigger, the line remains trained about the trigger even in the release position wherein the pivotal movement of the trigger modulates the pivotal movement of the fishing rod in response to the opposing forces exerted by the return spring and a fish on the line. Finally, the trigger is easily pivotally adjustable to regulate the sensitivity required for tripping the apparatus.

BRIEF DESCRIPTION OF THE DRAWINGS

FIG. 2 is a foreshortened side elevational view of the apparatus showing various pivoted positions for the trigger and rod support member in dotted lines;

FIG. 3 is a bottom view of the apparatus with dotted lines indicating the side to side pivotal movement of the base relative to the anchor;

FIG. 4 is a foreshortened front elevational view of the apparatus of the invention;

FIG. 5 is a foreshortened side elevational view of the apparatus with a fishing rod supported thereon and pivoted forwardly from the release position; and FIG. 6 is an enlarged detail perspective view of the fish line retainer on the trigger.

DESCRIPTION OF THE PREFERRED EMBODIMENT

Figure 1:
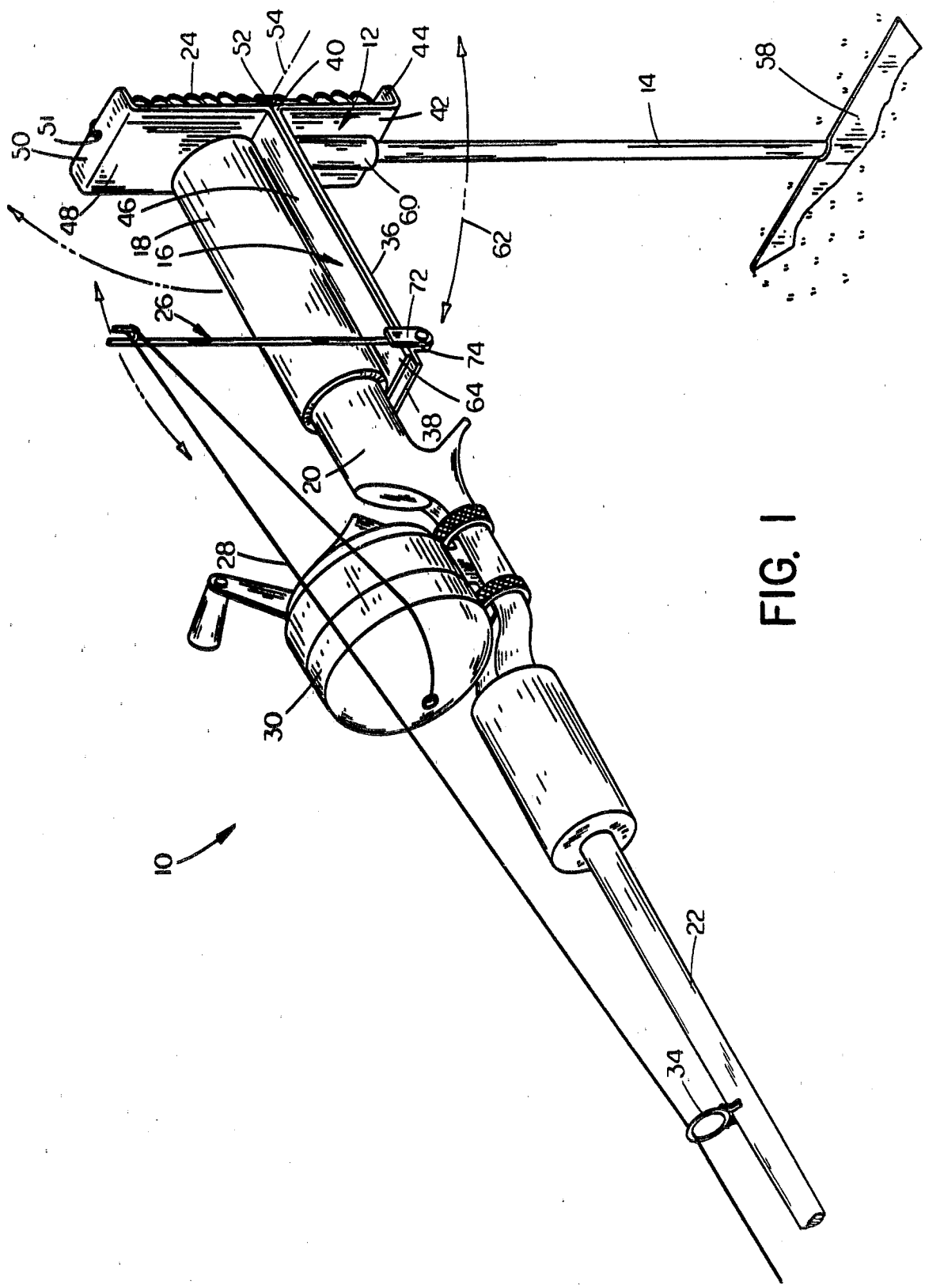
FIG. 1 is a perspective view of the automatic fishhook setting apparatus with the anchor penetrating the ground and a fishing rod supported thereon.

The automatic fishhook setting apparatus 10 of the present invention is shown in the drawings as including a generally L-shaped base 12 pivotally mounted on an upright anchor post 14 which is adapted for penetration into the ground. Another generally L-shaped fishing rod support member 16 is hingedly connected to the base 12 at their respective apices. The rod support member 16 includes an open ended tubular member 18 which is adapted to receive the handle 20 of a fishing rod 22 as shown in FIG. 1.

The rod support member 16 is pivotally movable between the solid line set position shown in FIGS. 1 and 2 wherein the rod is supported in generally forwarded extended position and the dotted line release position of FIG. 2 wherein the rod is supported in a generally upright position. A tension spring 24 biases the rod support member 16 to its release position.

An elongated upright trigger 26 is pivotally connected to the base 12 and engageable with the rod support member 16, in the set position thereof to releasably latch the rod support member in the set position against the urging of bias spring 24. By training the fishing line 28 rearwardly from reel 30 through a fishing line retainer 32 on the trigger 26 and then forwardly through the eyes 34 of the fishing rod 22, the action of a fish striking the hook is operative to pull the trigger forward causing the rod support member 16 to be pivoted upwardly by the spring 24 to securely set the hook in the fish's mouth.

The base 12 is shown as including an elongated generally horizontal plate 36 having forward and rearward ends 38 and 40 and a vertical plate 42 extended downwardly from the rearward end of horizontal plate 36. A rearwardly extended flange 44 is formed at the lower end of vertical plate 42.

Likewise, the fishing rod support member 16, in its set position of FIG. 1, includes a horizontal plate 46 which is joined to a vertical plate 48 having a rearwardly extended flange 50 at the upper end thereof. A hinge 52 connects the base 12 and rod support member 16 for pivotal movement about a transverse axis 54. The rod support member 16 may be constructed in part as substantially the mirror image of the base 12 with the exception that the horizontal plate 36 of the base protrudes forwardly beyond the forward end of the rod support member for a purpose described below.

Anchor post 14 includes an elongated rod having a sharpened lower end 56 and a downwardly tapering fin 58 secured to the rod adjacent its lower end to prevent rotation of the rod in the ground. An open bottomed sleeve 60 is secured to the vertical plate 42 of base 12 for receiving the anchor post in slip fit relation therein. The telescoping of sleeve 60 onto anchor post 14 also provides for side-to-side pivotal movement of base 12 relative to the anchor post as indicated by arrows 62 in FIGS. 1 and 3.

Tension spring 24 has upper and lower hooked ends which are fastened to the rearwardly extended flanges 44 and 50 by means of holes 45 and 51 provided in the respective flanges. Accordingly, no separate fasteners, hooks or other couplings are required for connecting the tension spring to the base 12 and rod support member 16.

It can be seen in FIG. 2 that the flanges 44 and 50 extend sufficiently rearwardly that the spring is never stretched to an over-center position, with the result that the rod support member 16 is continuously biased upwardly toward the dotted line release position of FIG. 2.

The means for latching the rod support member 16 in its set position includes the trigger 26 and an upwardly facing latching surface 64 on the rod support member 16. In the embodiment illustrated, latching surface 64 is simply the forward corner of the upper surface of horizontal plate 46 shown in FIG. 1.

Trigger 26 includes an elongated post 66 having upper and lower ends 68 and 70 and a bracket 72 fixed to the post 66 at a position adjacent and above the lower end. Bracket 72 is pivotally connected to a depending flange 74 on one edge of base 12 adjacent the forward end thereof. It can be seen in FIG. 4 that the lower end 70 of trigger post 66 acts as a downwardly facing latching surface which is movable into engagement with the upwardly facing latching surface 64 of the rod support member 16 when the latter is in its set position. The bracket 72 is laterally offset from the longitudinal axis of the trigger post 66, which axis therefore intersects latching surface 64 of the rod support member 16 when the apparatus is latched as shown in FIG. 4. The fishing line retainer 32 at the upper end of trigger post 66 may simply be an elbow shaped member fixed thereto as shown in FIG. 6.

In operation, a fisherman inserts the anchor post 14 into the ground on the bank of a lake, stream or the like and then fits the sleeve 60 of base 12 onto the upper end of the anchor post. The rod support member 16 is then manually pivoted from the dotted line release position of FIG. 2 to the solid line position, whereupon the trigger is pivoted rearwardly to engage the latching surfaces 64 and 70. The fishing rod 22 is then used to cast the free end of fishing line 28 into the body of water, it being understood that a hook of any conventional type is fastened to the line 28 adjacent its free end. The handle 20 of the fishing rod 22 is then simply inserted into tubular member 18 of rod support member 16 and a portion of the fishing line 28 adjacent reel 30 is drawn rearwardly onto the fishing line retainer 32 of trigger 26. It is preferred that the line 28 be wrapped around the retainer 32 as shown in FIG. 6.

When a fish strikes at the line, the forward pull on the fishing line pivots the trigger 26 forwardly to the dotted line release position indicated at 75 in FIG. 2 whereupon spring 24 pivots the fishing rod 22 and rod support member 16 upwardly and rearwardly thereby securely setting the hook in the fish's mouth.

Note in FIG. 2 that the trigger 26 may be pivotally adjusted in its set position forwardly or rearwardly of vertical as indicated by the dotted line upright positions 76 and 78 in FIG. 2. By pivoting the trigger forwardly to position 76, its downwardly facing latching surface 70 engages only the forward tip of latching surface 64, with the result that only a very slight pull on the line will be sufficient to actuate the hook setting apparatus. On the other hand, the trigger may be pivoted rearwardly to position 78 whereupon a relatively greater forward movement of the trigger is required for actuating the hook setting apparatus. The sensitivity of the latching mechanism is thus readily adjusted without tools or any extra procedure other than the normal setting of the apparatus.

It can be seen in FIG. 1 that the fishing line retainer 32 on trigger 26, in its set position, is positioned substantially rearwardly of reel 30. Furthermore, since a forward movement of the trigger trips the latching mechanism, the required line of force is substantially parallel to the longitudinal axis of the fishing rod. Since the fishing line extends directly forwardly from the trigger to and through the eyes of the fishing rod, there is little if any bending of the line. Reduced sensitivity from increased friction caused by bends in the line is thus eliminated.

The trigger 26 performs a dual function. Even after the apparatus has been tripped to set the hook in a fish's mouth, the fish line remains wrapped around the retainer 32 and tends to pivot the trigger to a position intersecting the angle formed by the portions of the fishing line extending from the reel and lowermost eye of the rod. Such movement of the trigger modulates or dampens the pulling forces which are transmitted to the hook in response to the tripping action of the apparatus. In this regard, it is preferred that the horizontal base plate 36 be engaged by the lower end 70 of the trigger to limit pivotal movement of the trigger to an arc of approximately 90°. In other words, the trigger can pivot somewhat forwardly of the release position 75 in FIG. 2 and rearwardly of position 78 before reaching its limit positions.

Whereas a preferred embodiment has been shown and described herein, it will be readily apparent to those skilled in the art that many modifications, substitutions and alterations may be made which are within the intended broad scope of the appended claims.

Thus there has been shown and described an improved automatic fishhook setting apparatus which accomplishes at least all of the stated objects.

I claim:

1. An automatic fish hook setting apparatus adapted for holding a fishing rod including a handle at one end, an eye on the opposite end, a reel adjacent said handle and a fish line extended from said reel through said eye and having a hook adjacent the free end thereof, said apparatus comprising, a base, an anchor post connected to said base and extended downwardly therefrom, a fishing rod support member connected to the base for pivotal movement between a set position for supporting the rod in a generally forwardly extended position and a release position for supporting the rod in a generally upright position, bias means for urging said rod support member to the release position therefor, and coacting latch means on said base and pole support member, said coacting latch means comprising an upwardly facing latching surface on said rod support member adjacent the forward end thereof and an elongated trigger having a lower end pivotally connected to said base, a fish line retaining means at the upper end of said trigger and a downwardly facing latching surface on said trigger adjacent and above said lower end, said trigger, upon movement of said pole support member to the set position therefor, being pivotally movable to a position wherein said latching surfaces are engaged to releasably secure said pole support member in the set position therefor against the urging of said bias means, whereby upon training the fish line through said fish line retaining means, a forward pull on the line is operative to pivot said trigger forwardly clear of said rod support member whereby said bias means is operative to pivot said rod support member upwardly to set the hook in a fish's mouth, said base and said pole support member, in the set position therefor, each including vertically spaced-apart rearwardly extended flanges, said bias means being connected to and extended between said flanges.

2. The apparatus of claim 2 wherein said base and rod support member are generally L-shaped members pivotally connected together at their apices.

3. The apparatus of claim 2 wherein said rearwardly extended flanges are integral parts of said base and rod support member.

4. The apparatus of claim 3 wherein said bias means comprises an elongated tension spring having hooked ends and each of said flanges includes a hole for receiving one of said hooked ends.

5. An automatic fish hook setting apparatus adapted for holding a fishing rod including a handle at one end, an eye on the opposite end, a reel adjacent said handle and a fish line extended from said reel through said eye and having a hook adjacent the free end thereof, said apparatus comprising, a base, an anchor post connected to said base and extended downwardly therefrom, a fishing rod support member connected to the base for pivotal movement between a set position for supporting the rod in a generally forwardly extended position and a release position for supporting the rod in a generally upright position, bias means for urging said rod support member to the release position therefor, and coacting latch means on said base and pole support member, said coacting latch means comprising an upwardly facing latching surface on said rod support member adjacent the forward end thereof and an elongated trigger having a lower end pivotally connected to said base, a fish line retaining means at the upper end of said trigger and a downwardly facing latching surface on said trigger adjacent and above said lower end, said trigger, upon movement of said pole support member to the set position therefor, being pivotally movable to a position wherein said latching surfaces are engaged to releasably secure said pole support member in the set position therefor against the urging of said bias means, whereby upon training the fish line through said fish line retaining means, a forward pull on the line is operative to pivot said trigger forwardly clear of said rod support member whereby said bias means is operative to pivot said rod support member upwardly to set the hook in a fish's mouth, said base comprising an elongated generally horizontal plate having forward and rearward ends, a generally vertical plate extended downwardly from the rearward end of said horizontal plate and a rearwardly extended flange adjacent the lower end of said vertical plate, said rod support member being connected to said base adjacent the juncture of said horizontal and vertical plates for pivotal movement about a transverse axis.

6. The apparatus of claim 5 wherein said rod support member, in the set position therefor, is in part constructed as substantially the mirror image of said base.

* * * * *